United States Patent [19]

Seko et al.

[11] 4,288,967
[45] Sep. 15, 1981

[54] CENTER SEALING DEVICE FOR A PLASTIC FILM IN A PACKAGING APPARATUS

[75] Inventors: Kiyoshi Seko, Nagoya; Mamoru Ichikawa, Aichi, both of Japan

[73] Assignees: Fuji Machinery Co. Ltd.; Japan Packaging Machinery Manu. Assn., both of Japan; part interest to each

[21] Appl. No.: 98,720

[22] Filed: Nov. 30, 1979

[51] Int. Cl.³ .................. B65B 51/26; B65B 9/06; B65B 51/28
[52] U.S. Cl. ........................ 53/550; 53/373; 156/583.1; 219/326
[58] Field of Search ............... 219/253, 301, 302, 304, 219/326, 328, 283; 53/373, 550, 553, 551, 552, 554, 555; 156/582, 583.1

[56] References Cited

U.S. PATENT DOCUMENTS

| | | | |
|---|---|---|---|
| 2,803,100 | 8/1957 | Aalseth | 53/550 X |
| 2,882,662 | 4/1959 | Campbell | 53/550 |
| 3,198,683 | 8/1965 | Lee | 53/373 X |
| 3,298,430 | 1/1967 | Kodaira | 219/326 X |
| 3,603,767 | 9/1971 | Scicchitano | 219/326 X |
| 3,677,329 | 7/1972 | Kirkpatrick | 219/326 X |
| 3,728,518 | 4/1973 | Kodaira | 219/326 |
| 3,902,046 | 8/1975 | Oi | 219/326 X |
| 3,943,686 | 3/1976 | Crawford et al. | 53/373 |

*Primary Examiner*—Horace M. Culver
*Attorney, Agent, or Firm*—John E. Benoit

[57] ABSTRACT

A heat sealing device in a packaging apparatus utilizing a plastic film for continuously seal an overlapped axial portion of the plastic film. The device comprises a pair of heating rollers which are rotatably and oppositely placed to hold the overlapped portion of the film between them. Each of the heating rollers has a heating surface in its outer periphery which is pressed against the film and a coaxial and annular sealed chamber which is formed inside the heating surface and contains working liquid as a heat medium. A heat source is provided to be opposite at least to a portion of the sealed chamber to heat the working liquid. The working liquid generates vaporized gas upon heating by the heat source, and the pressure and the temperature in the sealed chamber are maintained at a predetermined degree so that the vaporized gas is condensed substantially at the temperature for fusing the film.

5 Claims, 11 Drawing Figures

CENTER SEALING DEVICE FOR A PLASTIC FILM IN A PACKAGING APPARATUS

BACKGROUND OF THE INVENTION

1. Field of the Invention

The present invention relates to a center sealing device to be applied to a continuous packaging apparatus for wrapping products by a plastic film substantially in pillow forms. The center sealing device is utilized to seal by heat each cylindrical bag wrapping the product at its center portion, i.e., lapped axial ends thereof.

2. Description of the Prior Art

In a conventional center sealing device applied to such a packaging apparatus, a heat sealing member such as a heating roller is employed for sealing the film by heat. However, since such a heating roller is entirely heated and raises its temperature by an adjacent electric heater, the temperature on its sealing surface tends to vary in portion and in time and cannot be kept uniform depending on the quality and the form of the sealing member and the type and efficiency of the electrical system regarding the electric heater, leading to uneven sealing of the film and to various defects caused by inferior sealing of the film.

SUMMARY OF THE INVENTION

The present invention provides an improved heat sealing device which can overcome the aforementioned disadvantages of the prior art by employing a novel construction in which working fluid contained in a plurality of sealed chambers formed in the heating roller is heated to generate vaporized gas which functions as a heat medium to uniformly heat the heat sealing surface of the roller and keep the same at a predetermined temperature.

An object of the present invention is to provide a heat sealing device in a continuous packaging apparatus which can effectively seal lapped ends of each wrapping film along its center line while uniformly heating the sealng surface on the outer periphery of a heating roller.

Another object of the present invention is to provide a heat sealing device which can immediately compensate lowering of the heat on the heat sealing surface utilizing latent heat in gasification and condensation of working liquid contained in the heating roller.

Still another object of the present invention is to facilitate temperature control of an electric heater which functions as a heat source by utilizing working fluid condensable substantially at a temperature under which the film is fused in a sealed condition as a heat medium for the heat sealing surface.

A further object of the present invention is to simplify construction and manufacture of the heating roller by inserting a compact cylindrical member containing the working liquid into the heating roller as a jacket.

DESCRIPTION OF THE PREFERRED EMBODIMENT

Figure 1:
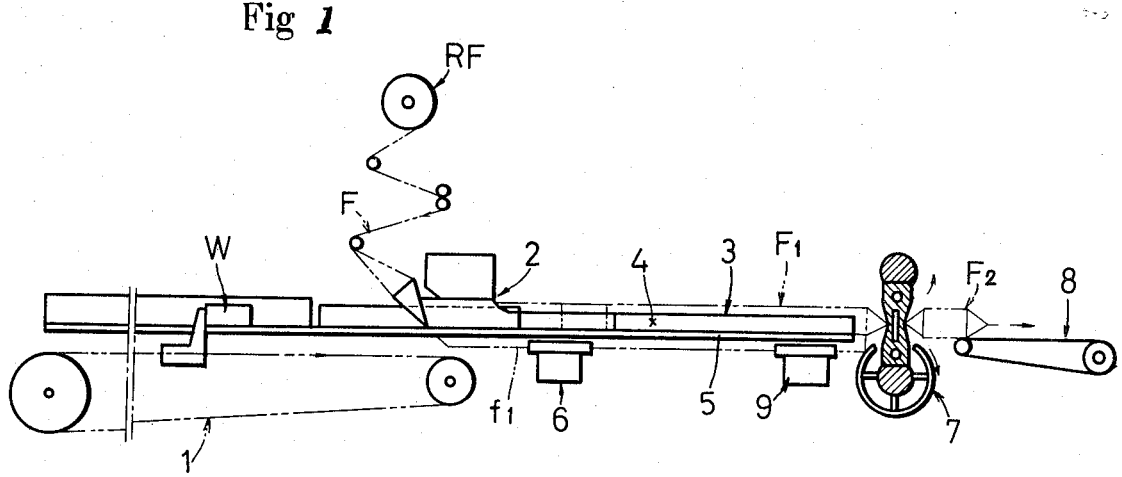
FIG. 1 is a schematic front elevational view of a packaging apparatus.

FIG. 1 illustrates a horizontal packaging apparatus to which the center sealing device according to the present invention is applied. In this packaging apparatus, products to be wrapped W are carried by a conveyer 1 at a constant speed while a long film F continuously supplied from a roll of film RF passes through a bag making device 2 and is tucked in a cylindrical form to wrap the product W in a cylindrical film F1. Under a pair of fixed feeding beds 3 for guiding the wrapped products W, there are provided a pair of feed rollers 6 which are identical with each other in diameter and which are adjacently rotated with respect to the center line of a guide channel 5 formed between the inner surfaces of the feeding beds 3 along the direction of conveyance. The shafts of the feed rollers 6 are linked with each other by an appropriate means such as gearing so that the feed rollers 6 are continuously rotated following the operational condition of the apparatus so as to continuously feed the cylindrical films F1 within a feeding path 4 holding therebetween lapped axial ends f1 of the cylindrical film F1 which are extending downwardly from the guide channel 5 and are to be sealed by heat. The product W and the cylindrical film F1 are conveyed in the channel-shaped feeding path 4 defined by the feeding beds 3. During this conveyance, the cylindrical film F1 is sealed in the axial direction by a center sealing device CS according to the present invention. Then an end sealing device 7 heat seals the cylindrical film F1 at two portions perpendicular to the axial direction during every rotation thereof. Thus, a completely sealed pillow-shaped bag F2 wraps the product W which is brought out from the packaging apparatus by another conveyer 8. In general, the cylindrical films F1 are severed at the centers of the sealed end portions so as to be separated from each other.

Figure 2:
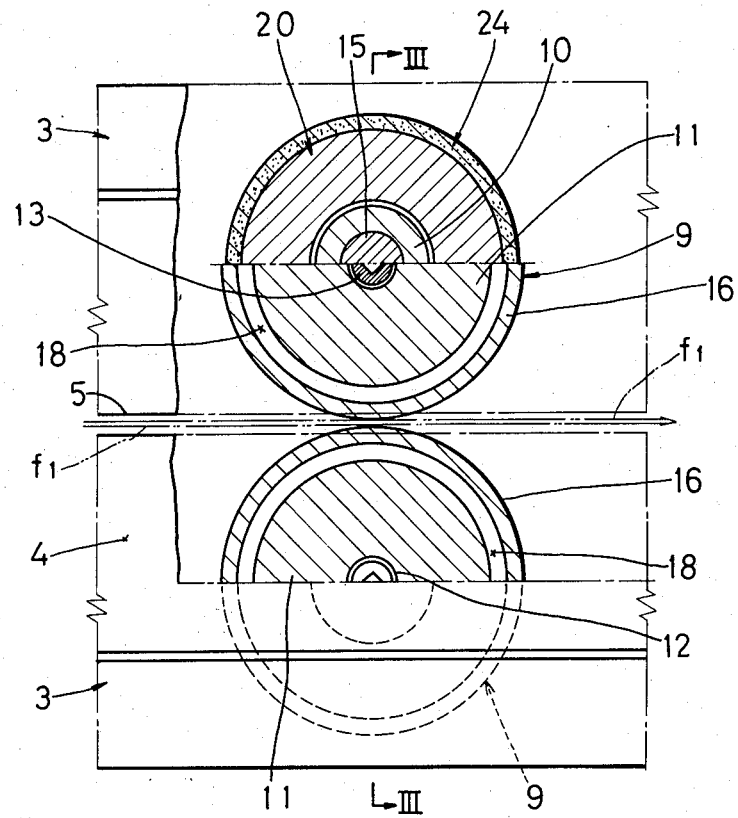
FIG. 2 is an enlarged partially fragmentary top plan view showing an embodiment of the center sealing device according to the present invention.
Figure 3:
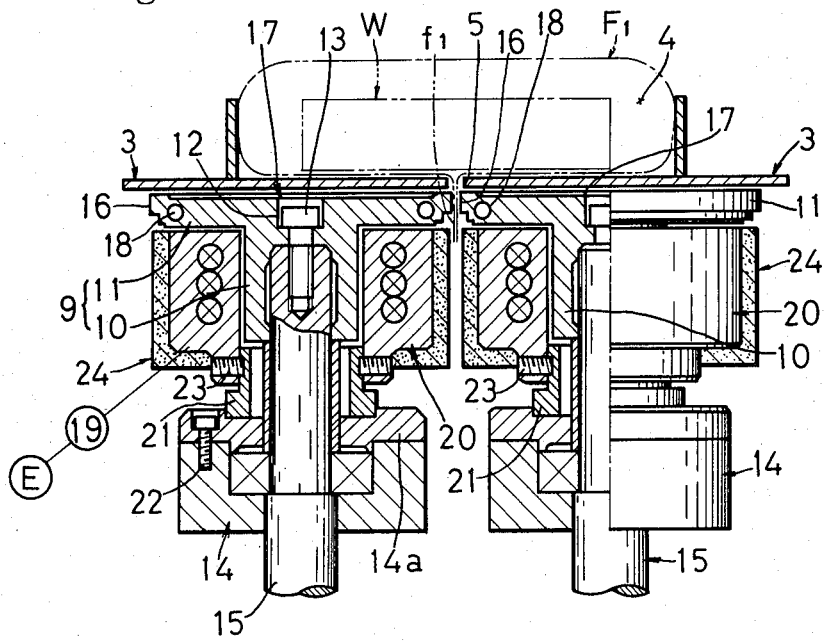
FIG. 3 is a vertical cross sectional view taken along the lines III—III in FIG. 2.

Referring to FIGS. 2 and 3, center sealing device CS according to the present invention has a pair of heatng rollers 9 which are identical in diameter with each other and are placed symmetrically under the feeding beds 3 forwardly of the feed rollers 6, i.e., in the right hand direction in FIG. 1. As shown in FIG. 3, each heating roller 9 comprises a small-diametrical hub 10 and a large-diametrical disc 11 formed thereon, and is supported by a bearing holder 14 through a bearing 14a. The heating rollers 9 are disengageably secured to a pair of rotating shafts 15 which are linked with each other by a means such as gearing (not shown) by engagement of the hubs 10 therewith and insertion of bolts 13 fitted in through-holes 12 formed in the centers of the discs 11 into the upper portions of the rotating shafts 15. By virture of this construction, sealing surfaces 16 formed in the outer peripheries of the discs 11 of the heating rollers 9 are continuously rotated by an appropriate driving means at the same circumferential speed with that of the feed rollers 6 in contact with each other to seal the lapped axial ends f1 of the cylindrical film F1 while holding the same therebetween. The upper surface 17 of each disc 11 is formed concavely so that enough space is left between the same and the lower surfaces of the feeding beds 3 to reduce heat transmission toward the feeding beds 3. The concavely-formed upper surface 17 is preferably covered with a heat insulating material. Both bearing holders 14 are swingable or movable with the heating rollers, and are driven to move between sealing positions and non-sealing positions by operation of a means such as an electromagnetic solenoid (not shown) which is timed to starting and stoppage of the packaging apparatus.

Figure 5A:
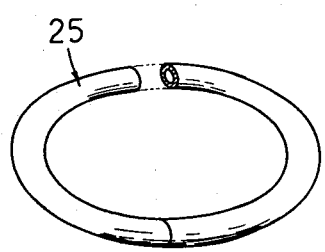
FIG. 5A is a perspective view of the heat pipe.
Figure 5B:
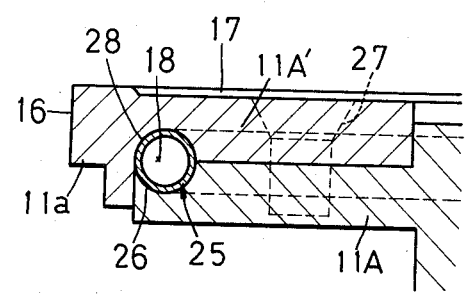
FIGS. 5B and 5C are partial cross sectional views showing another embodiment of the heat pipe.
Figure 5C:
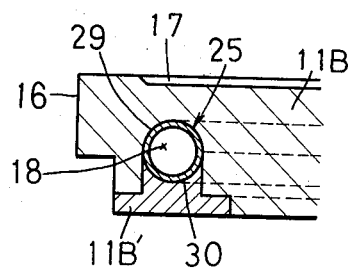

Referring to FIGS. 5A through 5C, within the disc 11 of each heating roller 9, there is provided a sealed annular chamber 18 in the vicinity of the sealing surface 16 and coaxial therewith. The chamber 18 is uniformly circular in section as shown in FIG. 2, and contains under vacuum a proper volume of working liquid L for generating condensable gas G as a heat medium for the sealing surface 16.

In general, the working liquid L in each heating roller 9 is heated from the outside, and as shown in FIG. 3, a cylindrical electric heater 20 connected to an electric source E to be controlled at a predetermined temperature by an appropriate voltage regulator 19 is provided to be opposed to the outer periphery of the hub 10 and the lower surface of the disc 11 of each heating roller 9. The heater 20 is engaged with a lid 14a which is secured to the bearing holder 14 by a bolt 22 and further disengageably mounted by a screw 23 to a supporting cylinder 21 spacedly enclosing the rotating shaft 15, and is covered with a heat insulating material 24 in its outer periphery.

The working liquid L is prepared by fluid which can easily be kept at an appropriate temperature for sealing the film F made of various kinds of soft plastics and is stable within a temperature range of 5° C. to 230° C. For example, water is very useful as the working liquid L. Further, main portions of the heating rollers 9 are made of copper or stainless steel depending on the characteristics of the working liquid L, and the sealing surfaces 16 are preferably coated by non-adhesive material such as Teflon so that the film F is easily separated therefrom after sealing. The sealed chambers 18 are preferably padded by a fibrous material such as metal or glass to facilitate returning of the working liquid L by capillarity, which is to be sufficiently filled by the working liquid L. The working liquid L may be introduced into the chambers 18 in a gaseous form.

Figure 4:
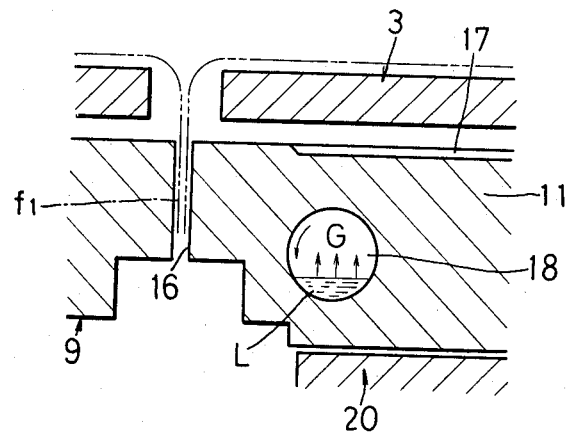
FIG. 4 is an illustrative cross sectional view showing the sealed chamber.

In the center sealing device CS of the aforementioned construction, each electric heater 20 heated at an appropriate temperature through the voltage regulator 19 heats the disc 11 of each heating roller 9 so that the working liquid L contained in the bottom of the chamber 18 evaporates by the heat of vaporization accompanied by pressure rising in the constant volume chamber to generate high-temperature condensable gas G, which fills the chamber 18 (see FIG. 4). The heat of the condensable gas G is transferred from the inner wall of the chamber 18 uniformly to the outer surface of the disc 11 so that the entire sealing surface 16 is uniformly heated at an appropriate temperature in a short time. It is to be noted that the device according to the present invention is set at an appropriate temperature in a very short time, i.e., about 2 or 3 minutes. This is under one-sixth of that of a conventional device as compared under the same condition.

In operation, the axial ends f1 of the cylindrical film F1 are guided in the center sealing device CS naturally held between the sealing surfaces 16 of the discs 11 of the heating rollers 9 which are synchronizedly rotated with the feed rollers 6, and heated at a predetermined temperature so that the lapped ends f1 are satisfactorily fused and pressed against each other to be continuously sealed by heat.

When the temperature of the sealing surfaces 16 is lowered because of heat absorption by the lapped ends f1 of the cylindrical film F1, part of the high-temperature gas G in the chambers 18 is condensed to generate a large amount of latent heat for compensating lowering of the temperature in the sealing surfaces 16.

The condensed liquid is circulated along the inner surface of the sealed chamber 18 to the bottom thereof as shown in FIG. 4, and is heated by the electric heater 20 to be again gasified. Such frequent conversion between the gaseous phase and the liquid phase is considerably efficient for continuously maintaining the sealing surfaces 16 of the heating rollers 9 at a predetermined temperature, and further, makes temperature control of the electric heater 20 easy. Thus, sealing operation of the center portion of the cylindrical film F1 by the sealing surfaces 16 can efficiently follow the high-speed operation of the packaging apparatus, and is uniformly and accurately repeated since the sealing surfaces 16 are always maintained uniformly at a predetermined temperature.

After a series of sealing operations on the film F is completed, the heating rollers 9 are moved back to the non-sealing positions and, simultaneously, the power from the electric source E is shut off to lower the temperature of the electric heater 20, and thus the condensable gas G in each chamber 18 is naturally cooled and condensed to return to the working liquid L. Consequently, the sealing surface 16 of each heating roller 9 is cooled in a relatively short time and kept at the normal temperature.

In the center sealing device CS according to the present invention, various kinds of films including thick and thin films can be effectively sealed by heat since the pressure and the temperature of the gas G in the chamber 18 is controlled substantially at a predetermined degree by temperature control of the electric heater 20 to determine the temperature of the sealing surface 16 at any desired degree. Further, the cylindrical film F1 and the products W are prevented from being influenced by heat since the amount of heat transfer toward the feeding beds 3 is minimized by virtue of concave configuration of the upper surface 17 of the heating roller 9 and the heat insulating material covering the same. Thus, even very narrow axial ends f1 of the cylindrical film can be accurately sealed by the heating rollers 9 located in the vicinity of the lower surfaces of the feeding beds 3. The thermal capacity of the electric heater 20 can be minimized since the outer surface thereof is covered by the heat insulating material 24 for reducing outward heat radiation. The electric heaters 20 can be manufactured in a block form to be placed separately in the circumferential direction or in a portion with respect to the lower surface of the discs 11. Further, the heating rollers 9 can be manufactured as an internal heating system by substituting cartridge heaters assembled therewithin for the electric heaters 20.

As hereinabove described, the sealing surface 16 in the center sealing device CS can be set at a predetermined temperature in a very short time so that the sealing operation is immediately started, leading to reduction of suspension time of the packaging apparatus therefor and improvement in operation efficiency.

The sealed chamber 18 may comprise a pipe which can be pre-filled with the working liquid L. Especially in the form as shown in the drawings, i.e., circular in section, the chamber 18 can availably be produced by a conventional circular pipe which can be easily obtained and worked. In such a case, an annular heat pipe 25 as shown in FIG. 5A can be employed as a single member, of which material, inner diameter in section and ring diameter are selected in consideration of the characteristics of the working liquid L, the width of the sealing surface 16 and the outer diameter of the disc 11 respectively. Both open ends of the heat pipe 25 are lined by a padding material if necessary. As shown in FIG. 5B, such a heat pipe 25 is sealingly interposed between a groove 26 formed in a disc body 11A and a groove 28 formed in a lid 11A' which is engagingly secured by means of a bolt 27 to the disc body 11A and having the sealing surface 16 in the outer periphery of its rim 11a. Or, as shown in FIG. 5C, the heat pipe 25 may be sealingly interposed between a groove 29 formed in a disc 11B having the sealing surface 16 and a groove 30 formed in a lid 11B' which is engagingly secured to the lower surface of the disc 11B. The heat pipe can easily follow various temperature conditions since it is disengageably assembled in the disc 11.

The chamber 18 and the heat pipe 25 are not necessarily formed to be circular in cross section, but can be oval or rectangular in section.

The center sealing device CS according to the present invention can easily be applied to a vertical type packaging apparatus by changing the direction of the rotating shafts 15 so that the heat rollers 9 come in contact with the lapped axial ends f1 of the cylindrical film F1 which is conveyed in the vertical direction.

Figure 6A:
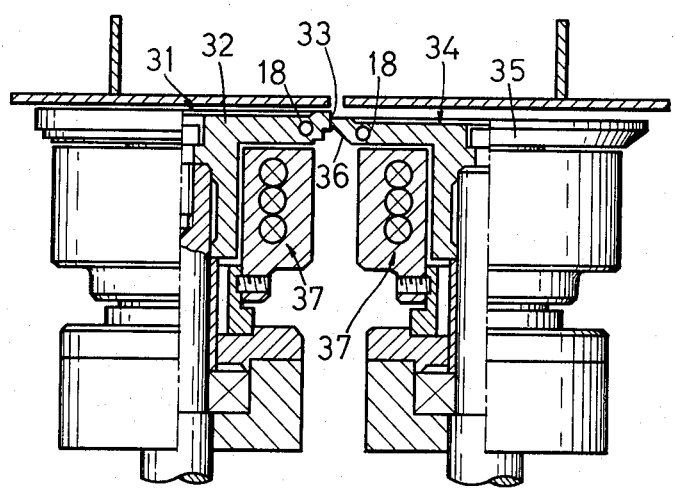
FIG. 6A is a partial fragmentary front elevational view showing another embodiment of the center sealing device according to the present invention employing a severing means.
Figure 6B:
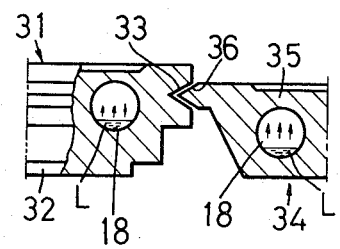
FIG. 6B is a partial enlarged cross sectional view of FIG. 6A.
Figure 7A:
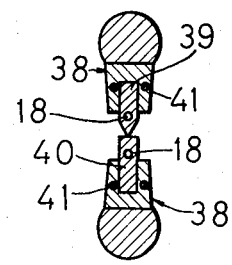
FIGS. 7A and 7B are partial cross sectional views showing embodiments of the end sealing device respectively.
Figure 7B:
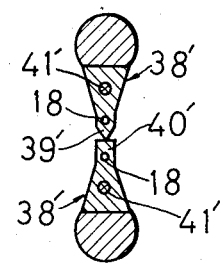

Further, the sealing surface gas heating system in the device according to the present invention can be easily adapted to a device in which the film is severed simultaneously with sealing. For example, in a device employing a severing means as shown in FIGS. 6A and 6B, the sealed chambers 18 are formed in the vicinity of a sealed portion receiving surface 33 in a disc 32 of a supporting roller 31 and in the vicinity of a sealed portion cutter 36 in a disc 35 of a sealing and severing roller 34 respectively to contain the working liquid L, and are heated by heaters 37. In an end sealing device as roughly illustrated in FIGS. 7A, the sealed chambers 18 are formed in a knife 39 and a knife seat 40 which are provided longitudinally in a vertical pair of heat sealing members 38 respectively to contain the working liquid L and are heated by adjacently-provided heaters 41. In another end sealing device as shown in FIG. 7B, the sealed chambers 18 are formed in a sealed portion cutter 39' and in a sealed portion receiver 40' which are integrally provided in the free ends of a pair of heat sealing members 38' respectively, and are heated by heaters 41'.

As hereinabove described, the present invention employs a heating system utilizing gas in which the working liquid in the sealed chambers is heated by electric heaters to generate vaporized gas for transferring a large amount of heat to the sealing surfaces. The device according to the present invention is absolutely different from the prior art devices in that enough amount of gas heat is transferred to the whole sealing surfaces of the heating rollers only by partial heating of the sealed chambers. Further, there is no need to limit the form and the type of the electric heaters, which need not be so strictly controlled, and the thermal capacity thereof can be minimized to achieve effective and uniform sealing.

While the invention has been described with reference to a few preferred embodiments thereof, it is to be understood that modifications or variations may be easily made without departing from the scope of this invention which is defined by the appended claims.

What is claimed is:

1. In a center sealing device for a packaging apparatus including a pair of rotatable heating roller means placed on a feeding path of a continuous cylindrical film spacedly containing products and capable of being sealed by heat, said heating roller means holding lapped axial ends of said film therebetween for continuously sealing said ends of every two adjacent packages by heat, said heating roller means comprising:
    outer peripheral surfaces having a predetermined width for contacting said lapped ends of said film and sealing the same by heat;
    a sealed chamber substantially uniform in section thereof in each of said heating roller means in the vicinity of said roller means adjacent to said outer periphery and extending coaxially along the entire circumference thereof, said chamber being at a reduced pressure;
    a heat transferring working liquid sealedly introduced into said sealed chamber to partially fill said chamber;
    a heat source adjacent to each of said heating roller means and said sealed chambers for vaporizing said working liquid;
    said vapor from said working liquid being condensed on the upper inner wall surface of said sealed chamber so as to discharge condensed latent heat for substantially maintaining said outer peripheral surfaces at a predetermined temperature.

2. The apparatus of claim 1 wherein said heat source is a fixed electric heater which is coaxially adjacent to said peripheral surfaces;
    and further comprising a voltage regulator for controlling the temperature of said electric heater.

3. The apparatus of claim 1 further comprising a disc on said heating roller means having a circular lid disengageable in the axial direction from said heating roller means so as to define an annular chamber between said lid and said disc.

4. The apparatus of claim 1 comprising a severing means adjacent to said outer peripheral surfaces having a knife and a knife seat which engage with each other when said discs maintain said lapped axial ends of said film therebetween.

5. The apparatus of claim 1 further comprising: insulation covering the outer surface of said electrical heater.

* * * * *